Patented July 4, 1944

2,352,671

UNITED STATES PATENT OFFICE 2,352,671

REACTION OF FORMALDEHYDE WITH ACRYLONITRILE AND PRODUCT

Joseph Frederic Walker, Lewiston, N. Y., assignor to E. I. du Pont de Nemours & Company, Wilmington, Del., a corporation of Delaware No Drawing. Application May 3, 1943,
Serial No. 485,494

4 Claims. (Cl. 260—464)

This invention relates to the reaction of formaldehyde and its polymers which function in chemical reactions as the equivalent of formaldehyde with unsaturated compounds, more particularly with acrylonitrile (vinyl cyanide). It is also concerned with the new chemical compounds produced thereby.

When formaldehyde, or a polymer of formaldehyde equivalent in chemical reactions to formaldehyde, such as paraformaldehyde, is reacted in an aqueous reaction mixture with acrylonitrile there are produced certain new chemical compounds depending on the number of moles of acrylonitrile which take part in the reaction. When one mole of formaldehyde reacts, in aqueous reaction mixture with one mole of acrylonitrile there is produced the hemiformal of ethylene cyanohydrin, a compound having the following formula:

When one mole of formaldehyde, or polymer of formaldehyde is reacted with two moles of acrylonitrile there is produced the formal of ethylene cyanohydrin, a compound having the following structure:

It is thus evident that in the aqueous reaction mixture the formaldehyde or paraformaldehyde reacts with the vinyl cyanide in the form of the hydrate of formaldehyde, i. e. as methylene glycol.

Accordingly, one of the objects of this invention is to prepare novel and valuable chemical compounds by reacting formaldehyde or formaldehyde polymers with acrylonitrile in the molecular proportions of: one mole of formaldehyde to one mole of acrylonitrile; and one mole of formaldehyde to two moles of acrylonitrile. Another object of this invention is the preparation of valuable chemical compounds, the hemiformal of ethylene cyanohydrin, and the formal of ethylene cyanohydrin, by reacting acrylonitrile with formaldehyde or a polymer thereof equivalent to formaldehyde in the reaction, said reaction being carried out in an aqueous reaction medium containing at least one mole of water per mole of available formaldehyde, and in the presence of an alkaline condensing agent. These and still further objects of my invention will be apparent from the ensuing disclosure of certain preferred embodiments, thereof.

Both formaldehyde and paraformaldehyde may be utilized in the reaction as the source of formaldehyde, the compound reacting in the form of its hydrate i. e.,

It is convenient to utilize the aqueous 37% solution of formaldehyde commercially available, although any other formaldehyde solution of any available concentration may be employed. As paraformaldehyde is substantially anhydrous when using this source of formaldehyde in the reaction it is important to introduce, in addition, a sufficient amount of water to provide an aqueous reaction medium.

I have found that it is essential to bring the reactants together in the presence of an alkaline catalyst or condensing agent. Alkaline materials, in general, are utilizable; however, with those which are less alkaline than sodium carbonate as, for example, the alkyl amines, the reaction occurs more slowly. Alkaline condensing agents, such as the alkali metal and alkaline earth metal oxides, hydroxides, carbonates, hydrides, alcoholates and cyanides will be found to give very satisfactory results. It is generally preferred to use the alkali metal hydroxides and cyanides as, for example, sodium hydroxide and sodium cyanide, since these are very satisfactory alkaline condensing agents.

The alkaline catalyst should be present in amount sufficient to render the reaction mixture distinctly alkaline. Ordinarily amounts ranging from 0.5% to 10% by weight based on the total weight of the reaction mixture are suitable. When the relatively stronger alkaline condensing agents such as sodium hydroxide are utilized, the amount need not generally exceed 3%.

In carrying out the reaction it is merely necessary to bring the formaldehyde or paraformaldehyde and acrylonitrile into contact in the aqueous reaction mixture in the presence of the alkaline condensing agent. Temperatures ranging from 0 to 100° C. are suitable, the reaction being of course more rapid at the more elevated temperatures. As the reaction is somewhat exothermic in character, when operating with large amounts of material it may be necessary to provide cooling means to eliminate excess heat.

In addition to the water in the reaction mixture there may also be present a diluent or an inert solvent, although as a general rule the use of such diluents is not necessary or desirable. Where a diluent is employed an inert solvent such as hexane, benzene, ether or petroleum ether is suitable. If desired, the formaldehyde or paraformaldhyde and acrylonitrile may be brought together and the alkaline catalyst dissolved in water added thereto. However, if desired, the acrylonitrile may be added directly to an aqueous solution of formaldehyde, such as the 37% commercial solution, in which the alkaline condensing agent has been dissolved. The particular order in which the reactants are added is not important and any conventional procedure may be adopted.

The best yields of product are obtained when the reaction mixture at the termination of the reaction is neutralized with acid before being subjected to distillation or extraction with a suitable solvent in order to recover the hemiformal or formal of ethylene cyanohydrin. The particular product resulting, i. e. the hemiformal or formal product, is regulated by controlling the ratio of the molar amount of formaldehyde (or formaldehyde polymer) to the molar amount of acrylonitrile, in accordance with the above explanation.

The new chemical compounds resulting, the hemiformal of ethylene cyanohydrin and the formal of ethylene cyanohydrin, are valuable as intermediates for the preparation of plasticizing agents and resinous products.

The invention is illustrated by the following example:

Example

In a reaction flask equipped with stirrer, reflux condenser and thermometer, there was introduced 206 gms. (4 mols) of acrylonitrile and 64 gms. paraformaldehyde (equivalent to 2 mols $CH_2O$) mixed with 36 cc. water containing 2 gms. dissolved sodium hydroxide. This mixture was then heated to reflux with continuous agitation and approximately 18 gms. of solid caustic soda was added gradually over a period of 7 to 8 hours. At the end of this period reaction was substantially complete, chemical analysis indicating the presence of only a small quantity of free formaldehyde in the reaction mixture.

The crude reaction mixture was then extracted with ether and separated from the aqueous residue. On distillation of this extract 91 gms. of product boiling at 140° C. to 155° C. at 4 mm. of mercury pressure was obtained. Fractional distillation of the crude product gave a material boiling at 155° C. to 160° C. at 2 mm. of mercury pressure. The product is a clear yellowish liquid having an odor similar to that of a fatty nitrile. On heating with caustic soda solution it hydrolyzes with evolution of ammonia. Molecular weight and nitrogen analyses indicate that it is the formal of ethylene cyano hydrin, $CH_2(OCH_2CH_2CN)_2$.

Various changes may be made in the above procedures given herein as illustrative of my invention without departing from the scope thereof.

I claim:

1. The process which comprises reacting a compound supplying formaldehyde selected from the group which consists of formaldehyde and paraformaldehyde with acrylonitrile in an aqueous reaction medium containing at least one mole of water for every mole of formaldehyde reacted, said reaction being effected in the presence of an alkaline condensing agent.

2. The process which comprises reacting formaldehyde and acrylonitrile in an aqueous reaction mixture containing at least one mole of water per mole of formaldehyde reacted, said reaction being effected in the presence of an alkaline condensing agent.

3. The process which comprises reacting paraformaldehyde with acrylonitrile in an aqueous reaction medium containing at least one mole of water per mole of formaldehyde reacted, said reaction being effected in the presence of an alkaline condensing agent.

4. As a new chemical compound the formal of ethylene cyanohydrin.

JOSEPH FREDERIC WALKER.